US008458607B2

(12) United States Patent
Haag

(10) Patent No.: US 8,458,607 B2
(45) Date of Patent: Jun. 4, 2013

(54) DECLARATIVE METHOD FOR HANDLING DEFAULTS

(75) Inventor: Albert Haag, Walldorf (DE)

(73) Assignee: SAP AG, Walldorf (DE)

( * ) Notice: Subject to any disclaimer, the term of this patent is extended or adjusted under 35 U.S.C. 154(b) by 330 days.

(21) Appl. No.: 12/871,781

(22) Filed: Aug. 30, 2010

(65) Prior Publication Data

US 2012/0054678 A1 Mar. 1, 2012

(51) Int. Cl.
*G06F 3/048* (2006.01)
*G06F 3/00* (2006.01)
*G06F 17/50* (2006.01)

(52) U.S. Cl.
USPC .............. 715/764; 715/810; 700/130; 700/97

(58) Field of Classification Search
USPC .............. 715/810, 764; 700/97, 103; 705/26.5
See application file for complete search history.

(56) References Cited

U.S. PATENT DOCUMENTS

| | | | | |
|---|---|---|---|---|
| 6,002,402 A * | 12/1999 | Schacher | ....................... | 715/810 |
| 7,003,360 B1 * | 2/2006 | Dillon | .............................. | 700/97 |
| 7,039,602 B1 * | 5/2006 | Kapadia et al. | .............. | 705/7.29 |
| 2010/0037142 A1 * | 2/2010 | Bagley et al. | .................. | 715/733 |
| 2010/0318483 A1 * | 12/2010 | Bagley et al. | ................... | 706/45 |

OTHER PUBLICATIONS

Felfernig, et al., Intelligent Support for Interactive Configuration of Mass-Customized Products, Jan. 1, 2001, Lecture Notes in Computer Science.*

Ishii et al., Interactive constraint satisfaction for office systems, 1994, Artificial Intelligence for Applications, 1994, Proceedings of the Tenth Conference on (0-8186-5550-X). p. 116-124.*
Plug-in Development Environment Guide, Jul. 8, 2006, IBM.*

\* cited by examiner

*Primary Examiner* — Jordany Nunez
(74) *Attorney, Agent, or Firm* — Brake Hughes Bellermann LLP

(57) ABSTRACT

According to various embodiments, methods, systems, and configuration applications for handling defaults and/or choices in a product configuration are provided. An exemplary method of handling defaults in a product configuration comprises presenting a product configuration to a user via a user interface. The method further comprises receiving a selection from the user of a configuration option via the user interface. The method further comprises determining, using a configuration engine implemented using instructions stored on one or more non-transitory computer-readable media and executable by one or more processors, at least one set of conflicting choices relating to a conflict resulting from the user selection of the configuration option and one or more constraints of the product configuration. The set of conflicting choices includes choices directly contributing to the conflict such that dropping any choice will resolve the conflict. The method further comprises determining, using the configuration engine, a strength level associated with each default selection in the minimal set of conflicting choices. The strength level of each default selection is based on an authority associated with a source of the default selection. The method further comprises determining, using the configuration engine, a default selection to drop based on its strength level. The method further comprises dropping, using the configuration engine, the determined default selection.

17 Claims, 7 Drawing Sheets

Key: (Strength Level) ~~ Default Selection
→ User Selection
Change From Previous State

DECLARATIVE METHOD FOR HANDLING DEFAULTS

BACKGROUND

The present disclosure relates generally to the field of computing systems. More particularly, the present disclosure relates to manipulating defaults in a product configuration system.

Product configuration is an important technology enabling businesses to deal with delivering and deploying customized products. An essential step is eliciting a complete and correct product specification (e.g., configuration) from the customer (e.g., user). In many cases, finding the optimal configuration solution for the user is a creative process that requires the user to decide trade-offs between conflicting goals. The user's decision-making process may be aided by an interactive dialog that is managed by a configuration application that provides decision support. A configuration application may make the user aware of which choices are available in a given situation and which are ruled out. It may also provide the user with guidance in resolving inconsistencies between the choices.

SUMMARY

According to one embodiment of the present disclosure, a method of handling defaults in a product configuration comprises presenting a product configuration to a user via a user interface. The method further comprises receiving a selection from the user of a configuration option via the user interface. The method further comprises determining, using a configuration engine implemented using instructions stored on one or more non-transitory computer-readable media and executable by one or more processors, at least one set of conflicting choices relating to a conflict resulting from the user selection of the configuration option and one or more constraints of the product configuration. The set of conflicting choices includes choices directly contributing to the conflict such that dropping any choice will resolve the conflict. The method further comprises determining, using the configuration engine, a strength level associated with each default selection in the minimal set of conflicting choices. The strength level of each default selection is based on an authority associated with a source of the default selection. The method further comprises determining, using the configuration engine, a default selection to drop based on its strength level. The method further comprises dropping, using the configuration engine, the determined default selection.

According to another embodiment of the present disclosure, a system for handling choices in a product configuration comprises one or more processors and one or more non-transitory computer-readable media having instructions stored thereon. The instructions are executable by the one or more processors to implement a method comprising presenting a product configuration to a user via a user interface. The product configuration includes one or more default selections. The method further comprises receiving a selection from the user of a configuration option via the user interface. The method further comprises determining at least one minimal set of conflicting choices relating to a conflict resulting from the user selection of the configuration option and one or more constraints of the product configuration. The minimal set of conflicting choices includes choices directly contributing to the conflict such that dropping any choice will resolve the conflict. The method further comprises determining a strength level associated with each default selection in the minimal set of conflicting choices. The strength level of each default selection is based on an authority associated with a source of the default selection. The method further comprises dropping a default selection in the minimal set of conflicting choices that has a lowest strength level of all default selections in the minimal set of conflicting choices.

According to yet another embodiment of the present disclosure, a configuration application comprises one or more non-transitory computer-readable media having instructions stored thereon. The instructions are executable by one or more processors to implement a method of handling choices in a product configuration. The method comprises presenting a product configuration to a user via a user interface. The product configuration includes one or more default selections. The method further comprises receiving a selection from the user of a configuration option via the user interface. The method further comprises determining at least one minimal set of conflicting choices relating to a conflict resulting from the user selection of the configuration option and one or more constraints of the product configuration. The minimal set of conflicting choices includes choices directly contributing to the conflict such that dropping any choice will resolve the conflict. The method further comprises determining a strength level associated with one or more choices in the minimal set of conflicting choices, each of the one or more choices being one of a user choice and a default choice. The strength level of each choice is based on an authority associated with a source of the default selection. The method further comprises dropping a choice in the minimal set of conflicting choices that has a lowest strength level of all choices in the minimal set of conflicting choices.

DETAILED DESCRIPTION

Figure 1:
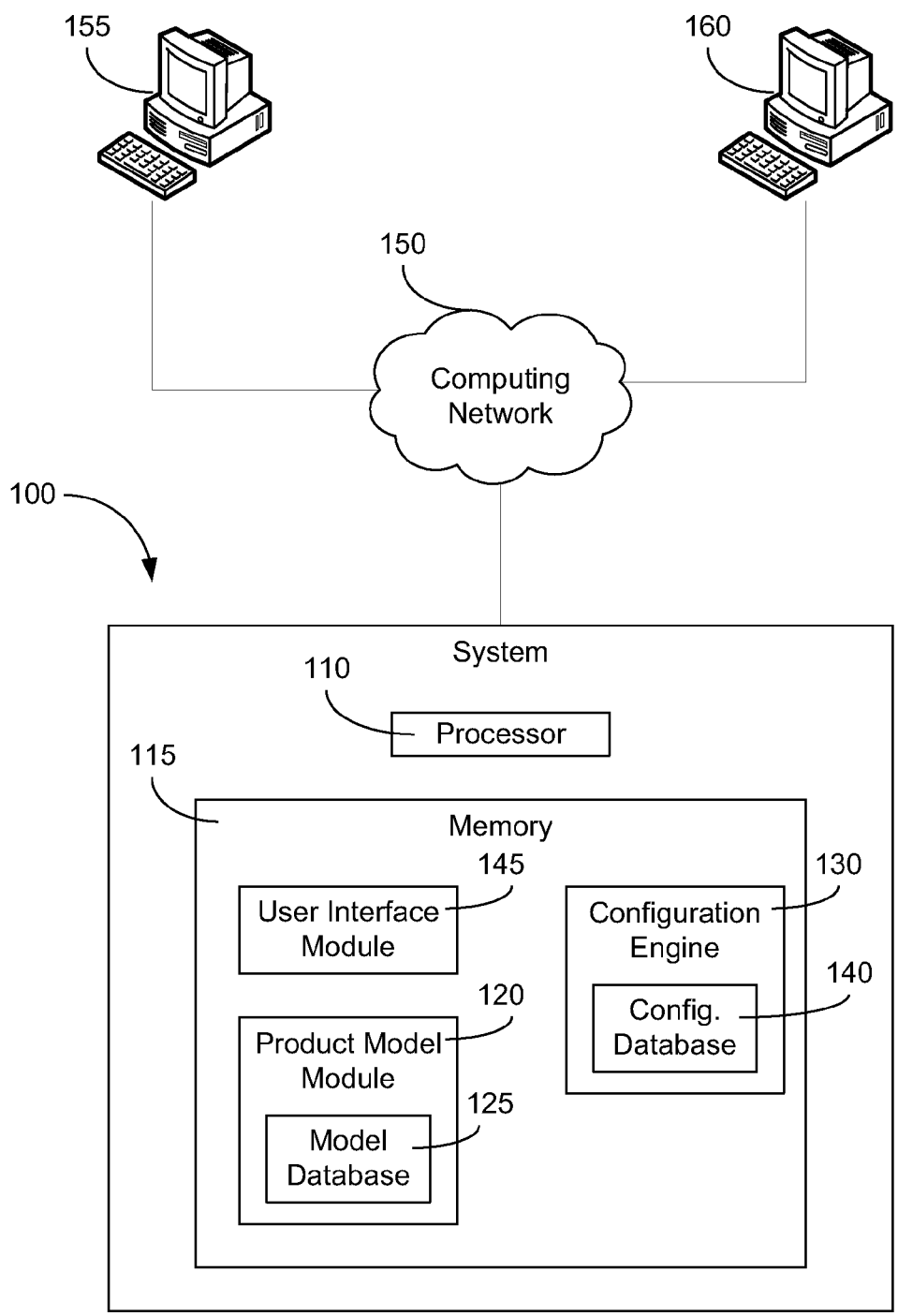
FIG. 1 is a block diagram of a system for generating a product configuration according to an exemplary embodiment.

Referring generally to the figures, systems and methods for handling defaults and choices related to product configurations are shown according to various exemplary embodiments. A product configuration method may utilize one or more predefined product models and/or configurations in soliciting an individual specification of a configurable product. The term "product" generally denotes anything a business produces and/or offers for sale. In various embodiments, the product that is the subject of a configuration may be a material product (e.g., a computer, car, industrial machine, etc.), a service (e.g., a haircut, house cleaning, etc.), a financial or legal product or agreement (e.g., a mortgage, life insurance, etc.), etc. In some embodiments, a product may include several types of components, such as a cellular phone with a service contract or a custom kitchen with an installation service. The term "product" may also denote processes that are not necessarily directly related to sales, such as business processes (e.g., internal business processes), technical processes (e.g., design configurations), and/or other types of processes.

Product configuration methods may utilize one or more predefined default parameters or selections to initially establish a product configuration. These defaults may be used to provide the user with an initial set of suggestions for certain features and/or help complete the configuration in absence of user input regarding some features. At times, a user selection may cause a conflict or inconsistency with one or more defaults. In some systems, inconsistencies may be avoided using procedural means that disallow a user from making a selection if it would result in a conflict. Designing such systems may be tedious and costly. Further, such systems restrict the user from making choices that the user may wish to make. For example, if the user is aware that making a choice would cause a conflict that may be addressed by making a different choice or dropping a default selection, the user may wish to proceed with making the choice even if it introduces a conflict that must be resolved.

The systems and methods disclosed herein are configured to resolve inconsistencies created by a user choice based on at least one determined minimal set of conflicting choices (MSCC). The choices in an MSCC, including user choices and defaults when applicable, directly cause an inconsistency. Dropping a single choice from the MSCC will remove this cause of inconsistency and resolve the MSCC, (e.g., such that any proper subset of choices in an MSCC is consistent). Each choice in an MSCC is associated with a strength level relating to an authority from which it is derived (or based on a notion of preference). If an MSCC contains a default choice of unique minimal strength the MSCC is resolved by dropping (e.g., deactivating) that choice. In some embodiments a choice with a unique minimal strength may be dropped even if it is a user choice. As illustrated in the exemplary embodiment shown in FIG. 3, a dropped choice may also resolve all other MSCCs in which the choice occurs. If a dropped choice occurs in an MSCC and it is not the minimal strength choice of the MSCC, and the minimal strength choice of the MSCC was previously dropped, then the minimal strength choice of the MSCC may be re-picked.

Various methods of dropping choices of minimal strength described herein have the property of being "declarative". The outcome (the set of automatically dropped choices) of a declarative method of handling defaults will not depend on the order in which the choices are selected in the configuration process or on the order in which the MSCCs are processed. This has many advantages over procedural (programmatic) means of deciding which defaults to drop. One such advantage is that the set of dropped choices will not be affected by saving and then reloading a configuration, even if the configuration properties are loaded in a different order than they were entered into the original configuration.

Referring now to FIG. 1, a block diagram of a system 100 for generating a product configuration is shown according to an exemplary embodiment. System 100 may be any type of computing system, such as a computer server, workstation, etc. System 100 is configured to generate one or more product configurations for presentation to a user. System 100 is further configured to receive user selections regarding the product configurations and make changes to the product configurations based on the user selections. In some embodiments, the product configurations may be presented to a local user of system 100. In other embodiments, the product configurations may be presented to a remote user (e.g., at computing systems 155 and/or 160) over a computing network 150 (e.g., the Internet).

System 100 includes a processor 110 as well as a memory 115 configured to store data, software modules, etc. Memory 115 may include a product model module 120 configured to maintain and/or modify one or more product models based on which configurations may be designed. A product model defines any required or optional components that may be used to generate a complete individual specification for a configurable product. For example, one product model relating to a computer system may include various possible components that may be chosen for a processor, monitor, memory, keyboard, mouse, graphics card, etc. In some embodiments, a product model may define various categories and subcategories of components of a product. For example, the computer system product model may include subcategories internal components and accessories. A product model may also define one or more constraints that govern the configuration of the product. For example, the computer system product model may require that a certain processor may only be paired with a particular monitor and a particular graphics card. In some embodiments, product models may be provided or predefined by a business offering one or more products related to the product models for sale. The various product models may be stored in a model database 125.

Memory 115 may include a configuration engine 130 configured to generate and maintain product configurations relating to one or more product models stored in model database 125. Configuration engine 130 may be configured to store and access one or more configurations (e.g., predefined, user-defined, etc.) in a configurations database 140. Each of the configurations stored in configurations database 140 may include selections based on default values stored in configurations database 140. In some embodiments, the defaults may be stored as part of configurations database 140 and/or model database 125. In various embodiments, configurations database 140 may contain configurations and/or default values that are predefined and/or obtained from any type of source. For example, a product model relating to a computer system may have a variety of different predefined configurations (e.g., a power user configuration, mid-level configuration, budget configuration, environmentally friendly configuration, etc.) provided by component manufacturers, a system designer/assembler, a corporate retail group, a regional retail group, a local store, etc. In various embodiments, different defaults available for use in various configurations may be defined by different entities as well. For example, the computer system product model may be associated with a first set of defaults provided based on suggested requirements from components manufacturers, a second set of defaults suggested by a system designer, a third set of defaults defined by a corporate retail group, a fourth set of defaults defined by a local retailer, etc.

Configuration engine 130 is configured to select and/or create an initial product configuration and present the product configuration to a user via user interface module 145. In some embodiments, one or more options may be preselected according to default values obtained from configurations database 140. A user may review the options presented in the initial product configuration and make one or more choices or selections. In some instances, the selections made by the user may be compatible with other user selections and/or defaults and the product may be configured according to the user selections and/or defaults.

In other instances, the selections made by the user may cause conflicts based on the constraints specified in the associated product model. For example, a constraint in a computer system product model may specify that a processor P1 cannot be paired with the combination of a graphics card GC1 and a monitor M2. An initial configuration may be based on defaults that cause processor P1, graphics card GC1 and a monitor M1 to be initially selected. Upon reviewing the initial configuration, a user may choose to select monitor M2 rather than monitor M1. The user's choice of monitor M2 causes a conflict based on the above constraint. To resolve the conflict, at least one of the user selection of monitor M2, the default selection of processor P1, and the default selection of graphics card GC1 must be dropped (e.g., removed from the active selections in the product configuration).

In various embodiments, configuration engine 130 may be configured to resolve conflicts in product configurations by dropping a default value having a lowest or minimal strength. Each default value stored in configurations database 140 and/or utilized in preparing a product configuration may have at least one of a plurality of strength levels or values assigned to it. The strength levels may be related to or based on the level of authority associated with a source of the default. In some embodiments, the level of authority may be based on a role of an individual (e.g., within an organization) or entity (e.g., within a group of entities) with which the default is associated. For example, for a particular product model and/or configuration a default D1 may stem from requirements specified by a CEO of a company and have a strength S1. Another default D2 may have a Vice President of the company as its source and have a strength S2. Yet another default D3 may have a Marketing Manager as its source and have a strength S3. Yet another default D4 may have an Engineer as its source and have a strength S4. The company may determine (e.g., in general or for the purposes of one or more particular products) that the CEO has the greatest authority, the Vice President has greater authority than the Marketing Manager and the Engineer, the Marketing Manager has greater authority than the Engineer, and the Engineer has the lowest authority. Accordingly, the hierarchical relationship between strength levels in this example may be expressed as S1>S2>S3>S4. In some embodiments, if a default value is associated with more than one strength value (e.g., if the default has been specified by multiple sources having different levels of authority) the strength level of the default is determined to be the highest of its associated strength values.

The authority of a source for the purposes of determining the strength of a default for a particular application may be determined in any manner deemed appropriate for a particular application. The authority need not necessarily be consistent with a traditional hierarchical role (e.g., a company decision-making hierarchy). For example, in some embodiments of the example described above, it may be defined that the Engineer has the greatest level of authority (e.g., because the Engineer has the greatest knowledge of the product). In some embodiments, different strength levels and/or levels of authority may be associated with different entities or organizations. For example, defaults relating to a car configuration may have different strength levels associated with a car manufacturer, a regional sales group, a local sales group, etc.

In some embodiments, the strength of a default choice may be determined additionally or alternatively based on one or more preferences. For example, default D2 in the above example may have a strength S2 and default D3 may have a strength S3 because a preference was identified in the design of the defaults that D3 be dropped before D2 in the event of a conflict. In some embodiments, the strength of some defaults may be based on the authority of a source of the defaults and the strength of other defaults may be based on preferences. For example, default D1 may have a highest strength S1 based on the authority of the source (i.e., the CEO) of the default, and default D2 may have a strength S2 based on a preference reflected in the design of the defaults.

Configuration engine 130 may begin to address a conflict by determining one or more minimal sets of conflicting choices ("MSCC") resulting from the user selection leading to the conflict. The MSCC's each include a set of choices directly causing a conflict, including user choices and defaults when applicable, such that dropping a single choice from the set will restore consistency. In the computer system configuration discussed above, the MSCC would include the user selection of monitor M2, the default selection of processor P1, and the default selection of graphics card GC1. Configuration engine 130 may retrieve the strength values relating to any defaults in the MSCC and determine if a unique default of minimal strength exists. If so, configuration engine 130 may resolve the conflict by dropping the unique default of minimal strength. In some embodiments, the initial configuration may contain sets of inconsistent default choices. In such embodiments, the system may apply the declarative resolution process described above before eliciting the first user selection.

In various embodiments, a user may be permitted to manipulate the product configuration in a variety of ways through use of user interface module 145. For example, a user may newly select a particular property or feature, making it a user choice. This may result in an active user choice. A user may also drop an existing choice (e.g., a default choice or previous user choice), removing support for the choice and/or inactivating the choice. A user may also re-pick a previously inactivated choice, which may result in reactivating the choice. The re-picked choice may include a previously selected and dropped user choice and/or a default choice that was deactivated (e.g., based on a constraint). A user may also retract a previously entered user selection, which may result in removing the user selection. In various other embodiments, a user may be enabled to perform other functions via a user interface such as user interface module 145, and all such functions are within the scope of the present disclosure.

Figure 2:
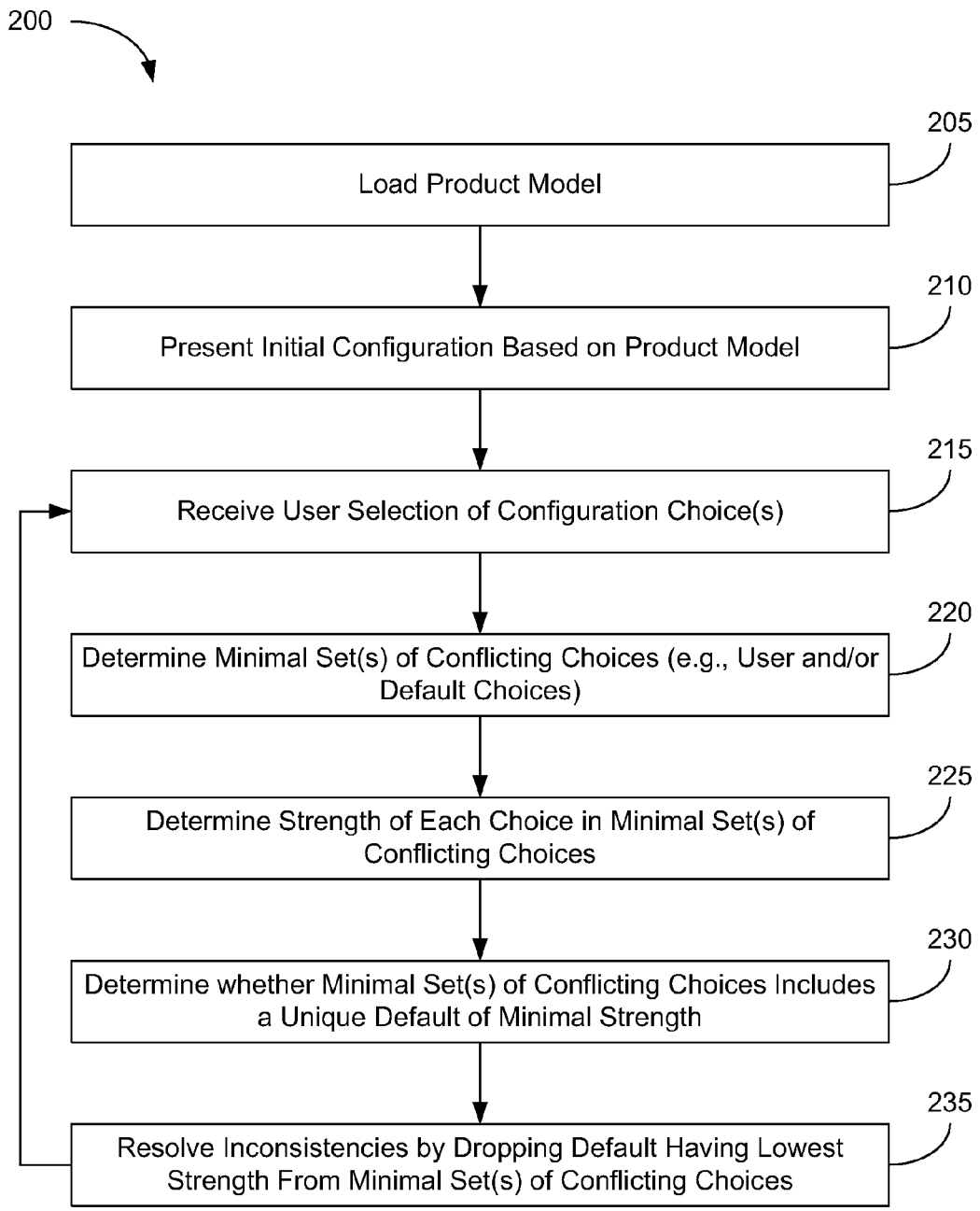
FIG. 2 is a flow diagram of a process for handling defaults in a product configuration according to an exemplary embodiment.

Referring now to FIG. 2, a flow diagram of a process 200 for handling defaults in a product configuration is shown according to an exemplary embodiment. Process 200 may be executed on a computing system such as system 100. At step 205, the system is configured to load a product model (e.g., retrieve a product model from memory, persistent storage, etc.). In some embodiments, the product model to be retrieved may be determined based on user input (e.g., user selection of an item, navigation to a particular web page or URL, etc.). At step 210, the system is configured to present an initial configuration based on the product model. In some embodiments, the initial configuration may be based at least in part on user input. For example, the initial configuration presented for a customized car may depend on a trim package (e.g., base, sport, luxury, etc.) selected.

At step 215, the system is configured to receive a user selection of a configuration choice. The user choice is analyzed against any constraints specified in the product model retrieved at step 205. In some instances, the user choice may not result in a conflict, and the user choice may be implemented without making adjustments to other active selections.

In other instances, the user choice may cause a conflict with one or more of the constraints, default choices, and/or other user choices. In such instances, the system is configured to determine one or more minimal sets of conflicting choices ("MSCC's") resulting from the user choice (step 220). If multiple MSCC's result from the user choice, the system may be configured to handle each individually (e.g., sequentially performing steps 225-235 for each MSCC, such that the steps are performed for the first MSCC, then the second MSCC, and so on).

At step 225, the system is configured to determine a strength level associated with each choice in the MSCC. In one embodiment, user choices may be defined as having a higher strength level than default choices (i.e., all user selections are above all default selections in a hierarchy). In some embodiments, it may be decided to never automatically drop a user choice, such that default selections included in the MSCC are automatically dropped before a user is asked to rescind a user selection.

Once the strength level associated with each choice in the MSCC has been determined, the system is configured to determine whether a unique default selection of minimal strength exists in the MSCC (e.g., the first MSCC) (step 230). If any one default selection in the MSCC has an associated strength level that is lower than the strength level of all other choices (e.g., default choices) in the MSCC, the MSCC includes a unique default of minimal strength. If the MSCC has a unique default of minimal strength, the inconsistency is resolved by dropping (e.g., deactivating) the unique default selection of minimal strength (step 235). If further MSCC's exist, dropping the default selection may resolve the conflict represented by those MSCC's as well if those MSCC's include the dropped default selection, rendering them resolved. If an MSCC has a unique minimal default choice and one of its other choices is dropped there may be no need to drop the minimal choice. In the event that the minimal choice was already dropped it can be re-picked, unless it is also the unique minimal choice of yet another MSCC without other dropped choices. If further MSCC's with a unique minimal default remain, steps 220-235 may be repeated until no further MSCCs with a unique minimal default exist.

In some embodiments, the subset of all MSCCs with unique default selections of minimal strength due to all user selections made up to that point can be determined and arranged in an ordering so that the unique minimal strength default choice of an element (an MSCC) is never smaller than that of the following element (i.e., descending order of minimal strength). In this embodiment steps 220-230 may be applied to the elements of this subset in order. In such an embodiment, re-picking may not be necessary due to the ordering of elements and/or order in which MSCC's are resolved.

Figure 3:
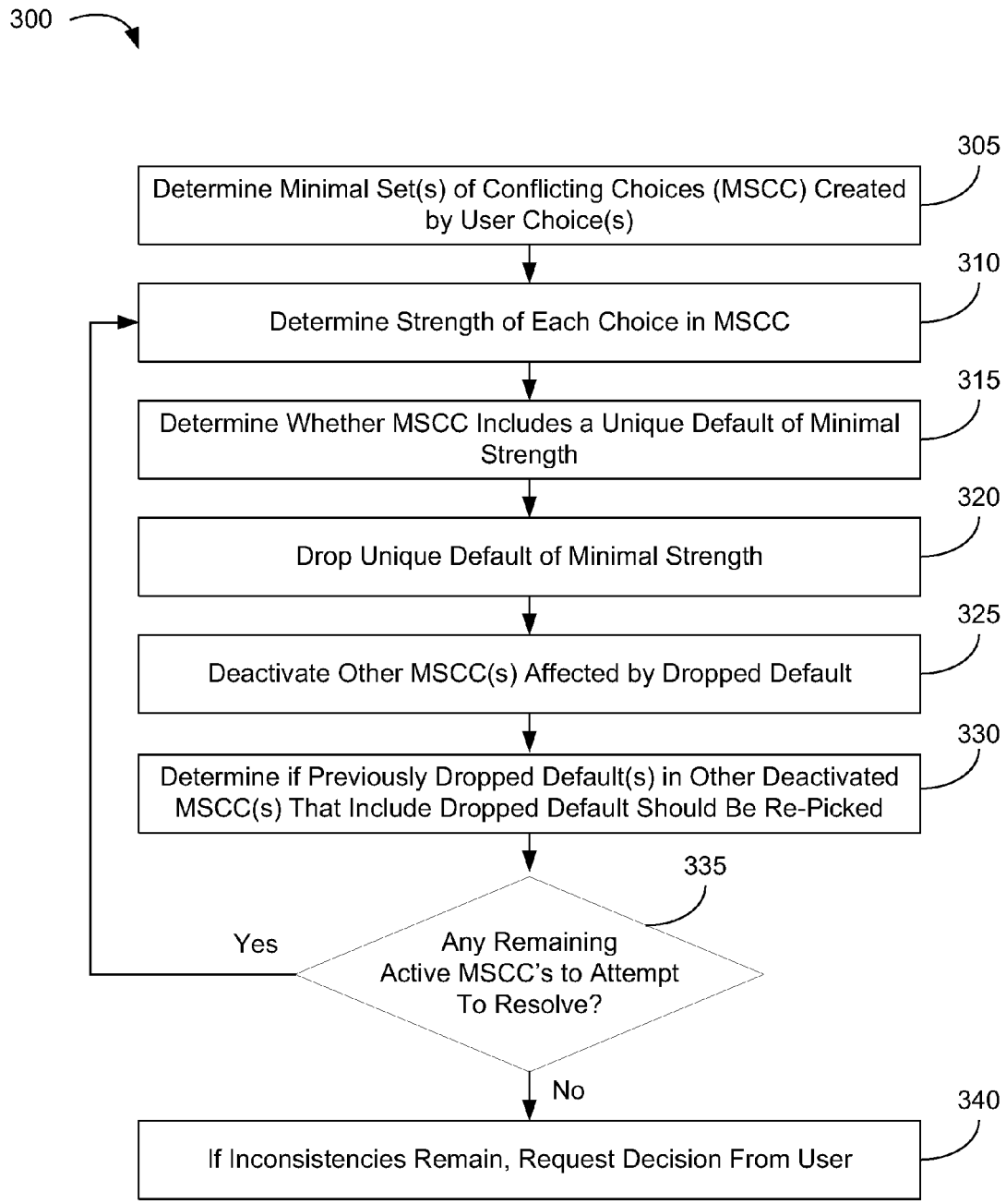
FIG. 3 is a flow diagram of a process for resolving inconsistencies in a product configuration according to an exemplary embodiment.

Referring now to FIG. 3, a flow diagram of a process 300 for resolving inconsistencies in a product configuration is shown according to an exemplary embodiment. Process 300 may be performed on a computing system such as system 100. Prior to the beginning of process 300, it has been determined that the configuration is inconsistent based on the user selections, choices, and/or the constraints of the product model. At step 305, the system is configured to determine at least one MSCC. At step 310, the system is configured to determine a strength level associated with each choice in the MSCC.

At step 315, the system is configured to analyze the determined strength levels of each default in the MSCC and determine whether a unique default of minimal strength exists in the MSCC. In some embodiments, only if such a minimal strength choice exists is this choice identified to be automatically dropped.

If the MSCC does include a unique default of minimal strength, the unique default of minimal strength is dropped (step 320), if the MSCC is not already resolved, i.e., contains no dropped choices. Dropping the unique default of minimal strength in the first MSCC may serve to resolve the conflict represented by any other remaining MSCC's that include the same default; accordingly, such MSCC's may be deactivated (step 325). At step 330, the system is configured to determine whether any other MSCC's include the dropped default. If other MSCC's exist that include the dropped default selection, including MSCC's that were previously resolved by dropping a weaker default than the dropped default selection, the system is configured to determine if a previously dropped default in another MSCC should be re-picked. This may be the case if there is no other MSCC in which the dropped default is a unique minimal strength default.

At step 335, the system determines whether any active MSCC's remain to which steps 305 through 330 have not been applied. If steps 305 through 330 have been applied to all MSCCs (i.e., the set of all choices that are automatically dropped has been uniquely determined) the system can proceed to determine if all MSCCs have been resolved. If this is the case (no inconsistency remains) then process 300 may end (e.g., the system may wait to receive a subsequent user choice). Otherwise the system is configured to inform the user of the conflict and request that the user make a choice or selection to resolve the remaining sources of inconsistency (step 340).

In some embodiments, the need for re-picking previously dropped choices (step 330) can be eliminated. This is achieved by starting the process (at step 305) with no choices dropped by the configurator engine and based on all valid user selections. The set of MSCCs is calculated as in step 305. In addition, the subset of those MSCCs with unique default selections of minimal strength is extracted and ordered by descending strength of their minimal choices. This ensures that when processing the this set of MSCCs in this order the minimal choice of an active/unresolved MSCC when dropped cannot occur in previous (already processed) MSCCs. In these embodiments it is still the case that dropping a minimal choice may also resolve other MSCCs (with or without minimal strength default choices).

In some embodiments, a product configuration may include one or more conditional choices. In one embodiment, default choices may depend on a condition. In another embodiment, user choices may also be conditional. Conditional choices occur only when associated conditions are met. A condition in turn depends upon the occurrence of one or more sets of active (e.g. picked) choices, referred to as the conditional environment of the conditional choice. A conditional choice can be dropped and picked like any other choice. The processes 200 and/or 300 may apply equally to conditional choices. However, a conditional choice can also become inactive by dropping other choices (i.e., when none of its conditional environments are active).

In some embodiments, various steps of methods described herein (e.g., processes 200 and/or 300 of FIGS. 2 and 3, respectively) may be implemented as a special extension to a Truth Maintenance System (TMS). A TMS may be configured to determine all necessary conflicting sets of choices and perform automatic dropping of choices as desired. Each property in the configuration can be seen as an atomic logical proposition, called a fact. Each fact has one or more justifications that record reasons for the validity of the fact in form of a direct dependency on a set of other facts called the justificand of the justification. A fact is founded if it has at least one founded justification. A justification is founded if its justificand contains only founded facts. A justification with an empty justificand is an independent justification and always founded. A conflict occurs if there is a valid justification for a special entity, the false fact. A choice is a fact that has one or more justifications due to either the user or defaults. Given a set of justifications a label of each fact can be calculated. The label is a complete and minimal set of environments, where each environment is a set of choices. "Complete and minimal" means that the fact is a valid part of the configuration if and only if all of the choices of at least one environment in its label are not dropped.

Each environment in the label of the false fact is called a nogood. Thus the term nogood corresponds, in this exemplary embodiment, to the term MSCC used above. Each justification records its source and strength. For example, a property selected by the user will have a justification which identifies the user as its owner and a strength that corresponds to that of the user. A selection by default will have a strength that is less than that of a user. The strength of a choice can be defined as the maximum strength of its founded justifications.

Labels are calculated only as needed. If the configuration is inconsistent the nogoods are calculated, the set of choices that can be dropped automatically is determined and these choices are dropped. This provides a declarative handling of defaults inasmuch as the set of automatically dropped choices depends only on the set of justifications (and their strengths) and the set of user dropped choices.

To deactivate an active nogood it suffices to drop one choice in the nogood. This can be done automatically if the decision to do so is unambiguous and independent of any processing order. In this exemplary embodiment, choices due to user input should never be dropped automatically.

Given a set of founded justifications J and a set of (manually) dropped choices there is unique set of choices that is dropped automatically by the TMS. This set as can be constructed iteratively as follows. Let D be the overall set of dropped choices (initially only the manually dropped choices). Let N be the set of active nogoods that have a unique least preferred choice given J and D. Order N by ascending minimal strength of choices. Let the minimal choice strength of the first element be S1. Drop all minimal choices in with strength S1 in elements of N. Remove any now inactive elements from N (at least the first element). N is still ordered by ascending strength of the least preferred choices. Repeat the above process until N is empty.

Figure 4:
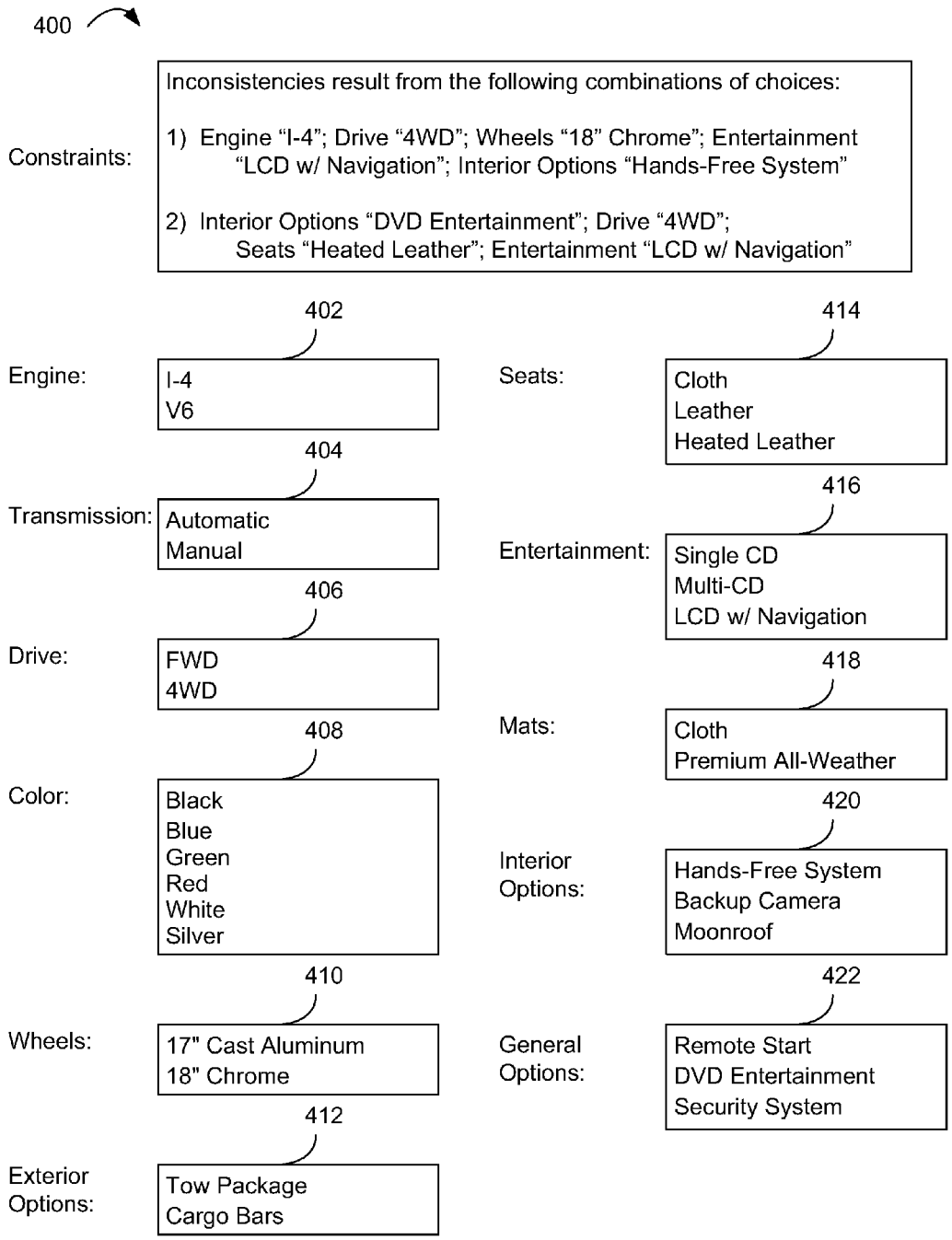
FIGS. 4, 5A, 5B, and 5C are illustrations of user interfaces relating to a product configuration according to an exemplary embodiment.

Referring now to FIG. 4, an illustration of a user interface 400 relating to a product configuration is shown according to an exemplary embodiment. User interface 400 may be a user interface used in relation to a configuration for a customizable vehicle. User interface 400 includes several user-selectable options including engine options 402, transmission options 404, drive type options 406, color options 408, wheel options 410, exterior options 412, seat options 414, entertainment options 416, mat options 418, interior options 420, and general options 422.

A variety of default selections may be associated with the configuration shown in user interface 400. In one embodiment, one of the initial choices presented to the user may be a trim level. One trim level that may be chosen by the user may be a Premium Package including the following default selections derived from the following sources:

| Source (Owner)/strength | Choice |
|---|---|
| Auto Manufacturer: (Strength SL4) | Engine = V6 Transmission = Manual Drive = 4WD |
| Corporate Group: (Strength SL3) | Wheels = 18" Chrome Seats = Heated Leather |
| Regional Group: (Strength SL2) | Entertainment = LCD w/ Navigation Color = Black |

-continued

| Source (Owner)/strength | Choice |
|---|---|
| Local Dealership: (Strength SL1) | Mats = Premium All-Weather Interior Options = Moonroof; Hands-Free System |

The strength levels associated with the defaults operate according to the following hierarchy of strengths: S4>S3>S2>S1.

Figure 5A:
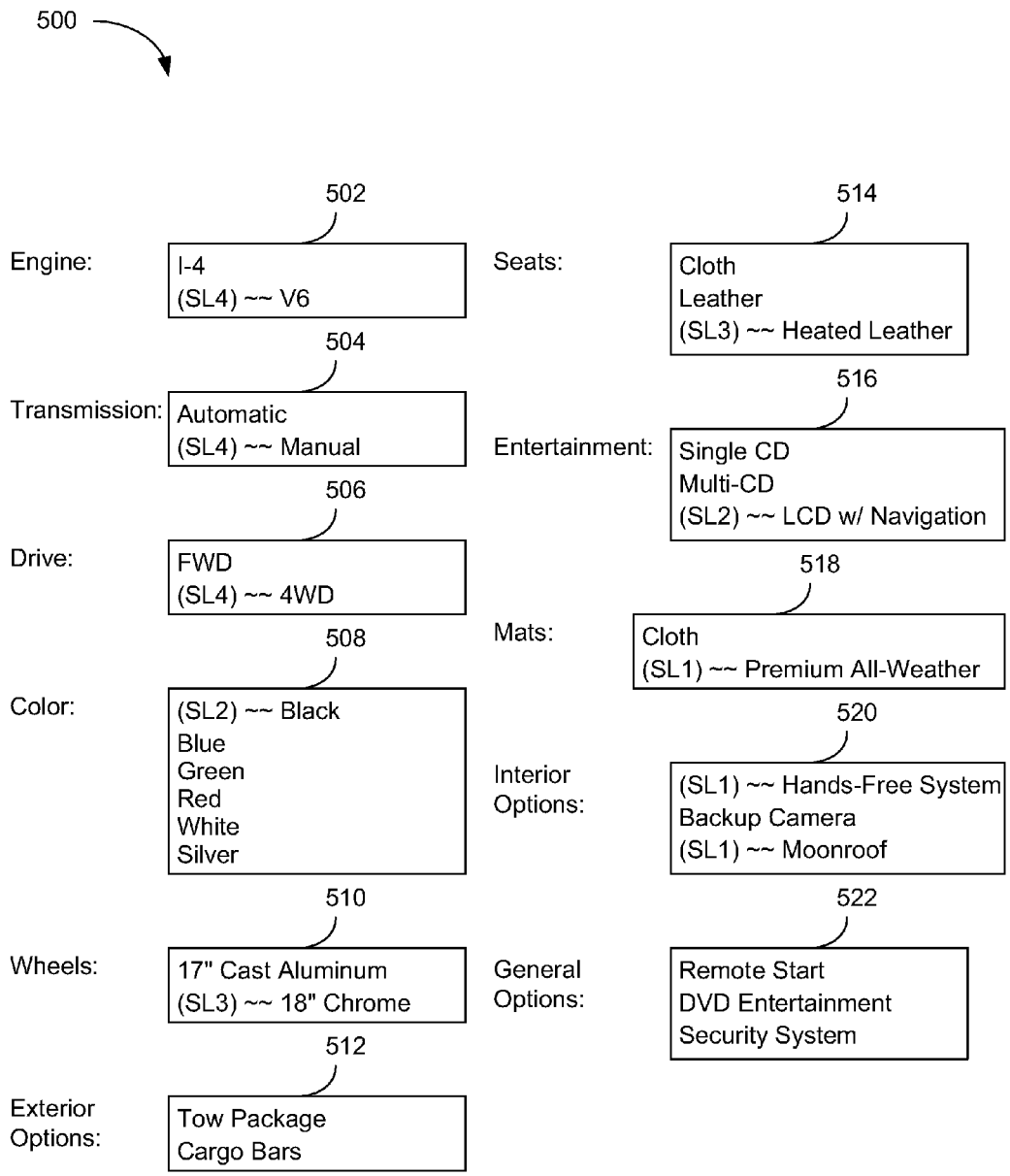

Referring now to FIG. 5A, an illustration of a user interface 500 that may result from implementing the defaults associated with the Premium Package in user interface 400 is shown according to an exemplary embodiment. User interface 500 may be an initial configuration presented to a user upon initial selection of the Premium Package. A number of default selections have been made in the initial configuration (as denoted by the arrow to the left of the options) in accordance with the defaults associated with the Premium Package.

In some embodiments, the vehicle model may specify one or more constraints that may not be violated when specifying the vehicle configuration. For example, the vehicle model may specify a first constraint that dictates that when an I-4 engine is selected, at least one of the following must not be selected: (1) Drive=4WD; (2) Wheels=18" Chrome; (3) Entertainment=LCD w/Navigation; and (4) Interior Options=Hands-Free System. The vehicle model may also specify a second constraint that specifies that when a DVD Entertainment System is selected, at least one of the following must not be selected: (1) Drive=4WD; (2) Seats=Heated Leather; and (3) Entertainment=LCD w/Navigation. These two constraints are treated as being applicable and active in the discussion herein with respect to FIGS. 5A through 5C.

Figure 5B:
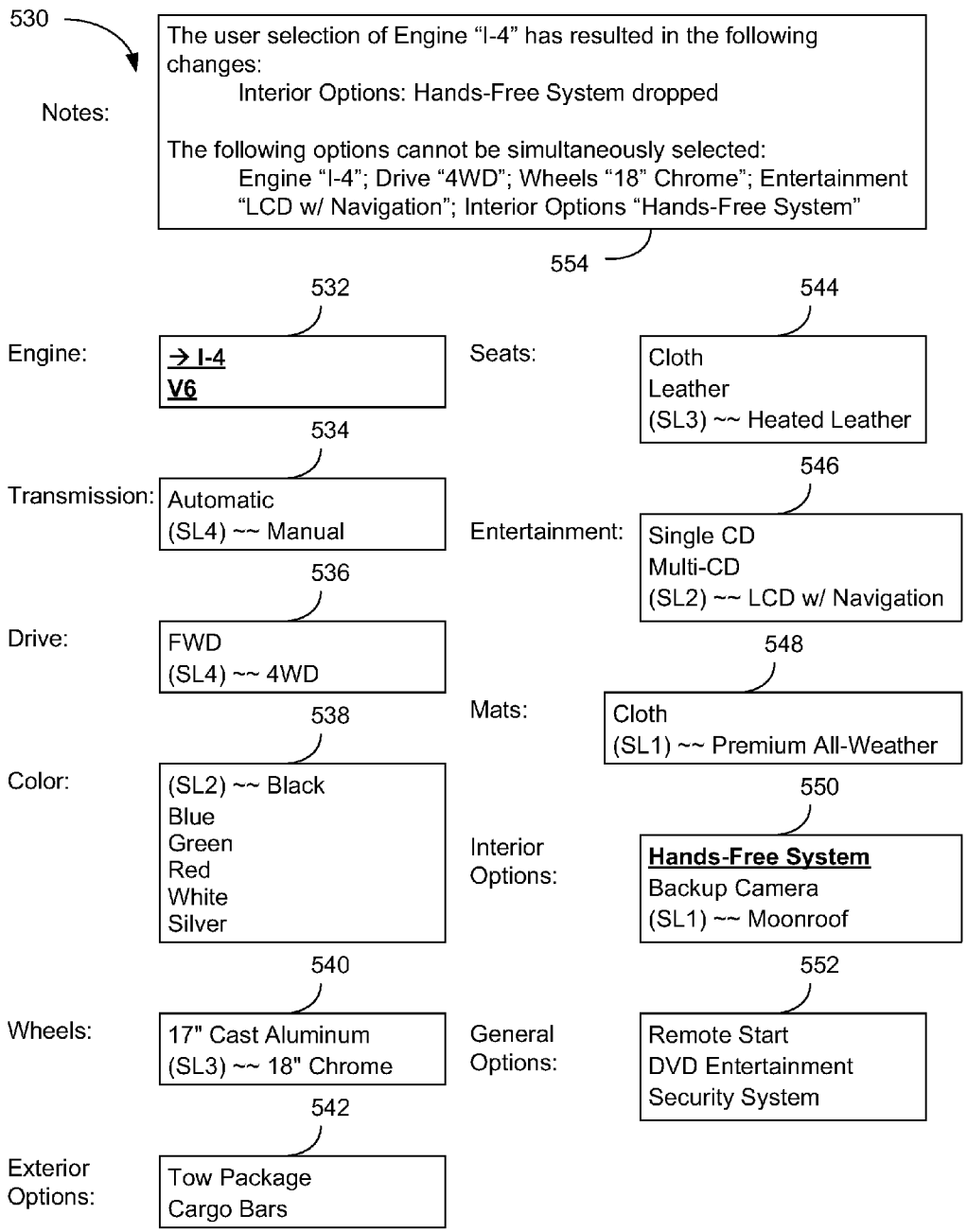

FIG. 5B illustrates a user interface 530 that may result from a user selection of an I-4 engine in user interface 500 according to an exemplary embodiment. The selection of the I-4 engine results in a conflict under the first constraint. The associated first MSCC includes the user choice "Engine I-4 selected," the default choice "Drive 4WD selected" (having strength S4), the default choice "Wheels 18" Chrome selected" (having strength S3), the default choice "Entertainment LCD w/Navigation selected" (having strength S2), and the default choice "Interior Options Hands-Free System selected" (having strength S1). The default choice "Interior Options Hands-Free System selected" is a unique default of minimal strength in the first MSCC because the strength of the choice, S1, is lower than the strength of any other default selection in the first MSCC. Accordingly, the default choice "Interior Options Hands-Free System selected" is dropped, as illustrated in interior options 550. No other MSCC includes the dropped default choice. User interface 530 may also include a notes dialog 554 configured to inform the user of the consequences of the choice of the I-4 engine and/or the constraints that led to the changes.

Figure 5C:
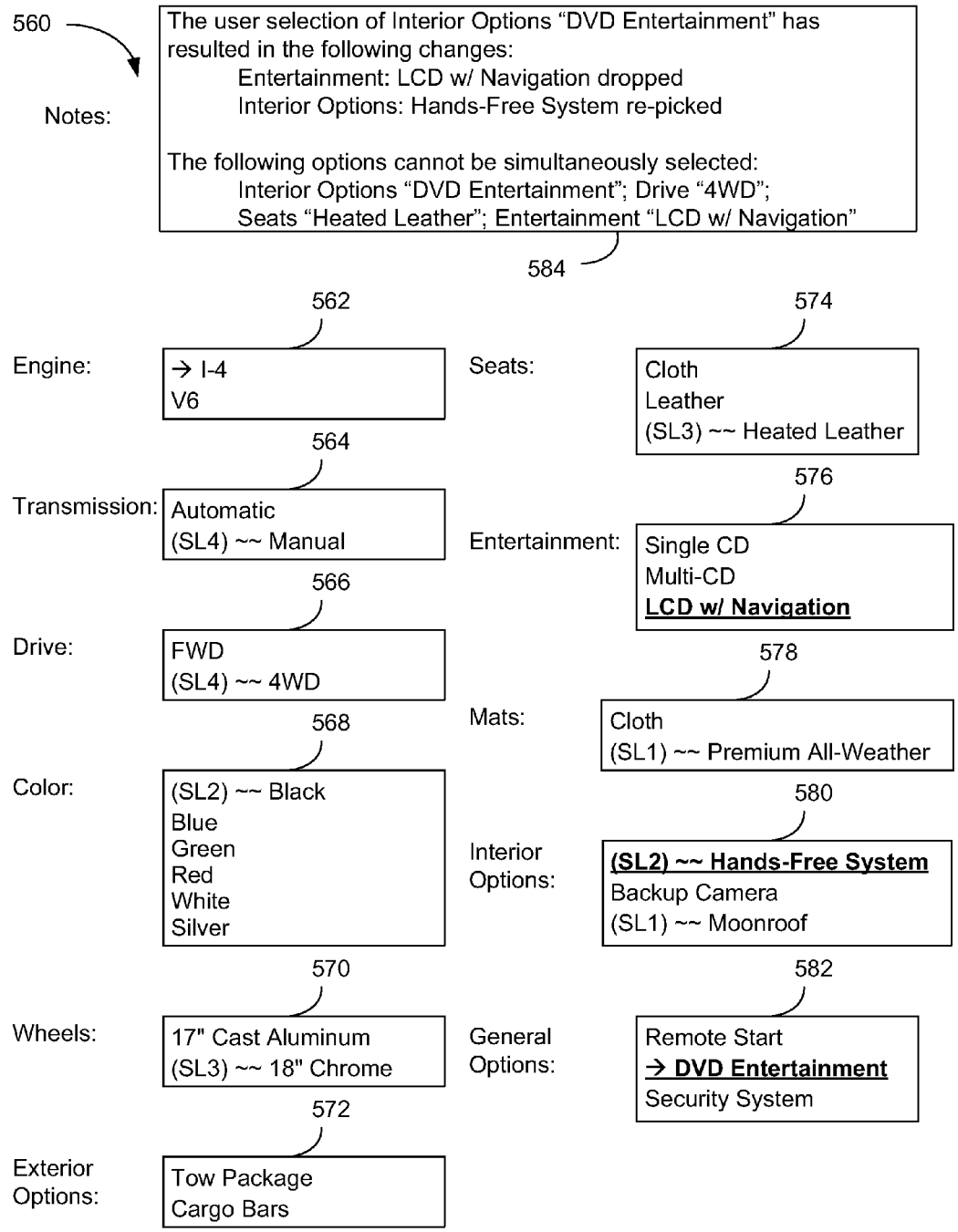

FIG. 5C illustrates a user interface 560 that may result from a user selection of a DVD Entertainment System in user interface 530 according to an exemplary embodiment. The selection of the DVD Entertainment System results in a conflict under the second constraint. The associated second MSCC includes the user choice "DVD Entertainment System selected," the default choice "Drive 4WD selected" (having strength S4), the default choice "Seats Heated Leather selected" (having strength S3), and the default choice "Entertainment LCD w/Navigation selected" (having strength S2). The default choice "Entertainment LCD w/Navigation selected" is a unique default of minimal strength in the second MSCC because the strength of the default, S2, is lower than the strength of any other default selection in the second MSCC. Accordingly, the default choice "Entertainment LCD w/Navigation selected" is dropped, as illustrated in entertainment options 576. The first MSCC also includes the dropped default choice "Entertainment LCD w/Navigation selected," and the previously dropped default "Interior Options Hands-Free System selected" has a lower strength (S1) than the recently dropped default "Entertainment LCD w/Navigation selected" (having strength S2). The default "Interior Options Hands-Free System selected" no longer leads to a conflict and is re-picked, as shown in interior options 580. Notes dialog 584 informs the user of the changes made and the constraint that led to the changes.

FIGS. 2 and 3 show processes that may be used to resolve conflicts in a product configuration based on a minimal set of conflicting choices, where dropping a single choice results in elimination of the conflict. In some embodiments, processes similar to processes 200 and/or 300 may be used to resolve conflicts based on a set (e.g., a non-minimal set) of conflicting choices comprising a plurality of subsets of choices, each of which includes one or more choices, such that dropping all choices of any one subset may result in resolution of the conflict. For example, in one embodiment, a set of conflicting choices may include six choices, C1 through C6. The conflict relating to the set of conflict choices may be resolved by dropping: (1) C1, (2) C2 and C3, or (3) C4, C5 and C6. Accordingly, this exemplary set of conflicting choices includes three subsets of choices, SS1 (including C1), SS2 (including C2 and C3), and SS3 (including C4, C5 and C6). Dropping all choices of any one of SS1, SS2 or SS3 would resolve the conflict.

In such embodiments, each subset of choices may be associated with a strength level. In some embodiments, the strength level of each subset may be based on the strength level of the choices that comprise the subset. For example, the strength level of a subset may be defined to be equal to the highest strength level of its component choices. In other embodiments, the strength level of the subset may be defined to be the strength level of a different choice (e.g., the lowest strength level, an intermediate strength level, etc.). In still further embodiments, the strength level of the subset may be defined based on a combination of the strength levels of the component choices (e.g., an average of the strength levels).

Various embodiments disclosed herein may be applied in various applications, such as product configuration in the context of business processes and/or technical processes. For example, one or more processes (e.g., processes 200 and/or 300) may be used in conjunction with a business process configuration for a system (e.g., an internal bank system) for loan processing. A constraint of the system may provide that no loans can be processed having a down payment of less than five percent, a credit score of less than 625, and an annual income of less than 33 percent of the loan value. By default, the system may be configured to set the maximum loan value such that the annual income is 25 percent of a borrower's annual income (strength S1) and the minimum down payment is three percent (strength S2>S1). A loan officer may specify that a loan should be issued to a borrower with a credit score of 600. This may cause a MSCC including the following choices: (1) a borrower credit score below 625 (user choice with strength S3>S2>S1), (2) an annual income of less than 33 percent of the loan value (default with strength S2), and (3) a down payment less than five percent (default with strength S1). Because the down payment default has the lowest strength, it may be dropped by the system to resolve the MSCC. Accordingly, the system may raise the minimum down payment to require that the borrower put at least five percent down to obtain the loan.

In other embodiments, processes disclosed herein may be applied to technical processes. For example, a system may have defaults associated with a safety officer that may have a higher source of authority than those associated with a process designer. A person of skill in the art will appreciate that the methods and systems described herein may be applied to a variety of different process configurations (e.g., sequences of inter-dependent steps), system configurations, device configurations, etc., and all such variations are within the scope of the present disclosure.

According to an exemplary embodiment, a configuration application comprises one or more non-transitory computer-readable media having instructions stored thereon. The instructions are executable by one or more processors to implement a method of handling defaults in a product configuration. The method further comprises loading a product model that may entail one or more default choices. The method further comprises presenting a product configuration to a user via a user interface. The method further comprises receiving a selection from the user of a configuration option via the user interface. The method further comprises applying inferences due to the constraints contained in the product model. In particular, the constraints are used to determine whether the resulting configuration is consistent and complete. In the event of an inconsistency, the method further comprises determining at least one set of conflicting choices resulting from the user selection of the configuration option and/or default choices. An inconsistency is resolved by dropping one or more conflicting choices. The method further comprises determining a strength level associated with each choice. The strength level of a choice is based on an authority associated with a source of the choice. In another embodiment, the strength of a choice can also reflect a preference ordering of the choices. In the event of an inconsistency, the method further comprises determining a subset of choices to drop automatically based on their strength level and a subset of choices where a user decision is needed.

According to another exemplary embodiment, a method of handling defaults in a product configuration comprises presenting a product configuration to a user via a user interface. The method further comprises receiving a selection from the user of a configuration option via the user interface. The method further comprises determining, using a configuration engine implemented using instructions stored on one or more non-transitory computer-readable media and executable by one or more processors, at least one set of conflicting choices relating to a conflict resulting from the user selection of the configuration option and one or more constraints of the product configuration. The set of conflicting choices contains one or more subsets of choices. Each subset of choices comprises one or more choices. Dropping the choices of one of the subsets will resolve the conflict. The method further comprises determining, using the configuration engine, a strength level associated with each subset of choices based on strength level of the choices of the subset. The strength level of each choice of the subset is based on an authority associated with a source of the choice. The method further comprises determining, using the configuration engine, a subset of choices to drop based on its strength level. The method further comprises dropping, using the configuration engine, the determined subset of choices.

According to another exemplary embodiment, each of the choices in the dropped subset of choices is a default selection.

According to another exemplary embodiment, determining a subset of choices to drop comprises identifying a subset of choices having a lowest strength level as the subset of choices to drop.

According to another exemplary embodiment, the subset of choices having the lowest strength level is dropped automatically without requesting input from the user to drop the subset of choices having the lowest strength level.

According to another exemplary embodiment, dropping the subset having the lowest strength level comprises informing the user of the conflict and requesting input from the user to resolve the conflict when a plurality of subsets in the set of conflicting choices share the lowest strength level.

According to another exemplary embodiment, determining at least one set of conflicting choices comprises determining a plurality of sets of conflicting choices. Dropping a subset of the set of conflicting choices further comprises determining if one or more other sets of conflicting choices also include one or more choices of the dropped subset, determining if one or more choices in another set of conflicting choices including one or more choices of the dropped subset was previously dropped and has a lower strength level than the one or more choices of the dropped subset, and re-picking a choice that was previously dropped and has a lower strength than the one or more choices of the dropped subset.

According to another exemplary embodiment, the method further comprises informing the user that the subset of choices has been dropped via the user interface.

According to another exemplary embodiment, the product configuration is one of a material product configuration, a service configuration, a business process configuration, and a technical process configuration.

The embodiments of the present disclosure have been described with reference to drawings. The drawings illustrate certain details of specific embodiments that implement the systems and methods and programs of the present disclosure. However, describing the invention with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium (e.g., non-transitory medium) which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments of the disclosure has been presented for purposes of illustration and description. It is not intended to be exhaustive or limiting to the precise form disclosed, and modifications and variations are possible in light of the above teachings or may be acquired from practice. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

The exemplary embodiments illustrated in the figures and described above are offered by way of example only. Other embodiments may include, for example, structures with different data mapping or different data. The disclosure is not limited to a particular embodiment, but extends to various modifications, combinations, and permutations that nevertheless fall within the scope and spirit of the appended claims.

What is claimed is:

1. A method of handling defaults in a product configuration, the method comprising:
    presenting a product configuration to a user via a user interface; receiving selection from the user of a configuration option via the user interface;
    determining, using a configuration engine implemented using instructions stored on one or more non-transitory computer-readable media and executable by one or more processors, at least one set of conflicting choices relating to a conflict resulting from the user selection of the configuration option and one or more constraints of the product configuration, wherein the set of conflicting choices includes choices directly contributing to the conflict such that dropping any choice will resolve the conflict;
    determining, using the configuration engine, a strength level associated with each default selection in the set of conflicting choices, wherein the strength level of each default selection is based on an authority associated with a source of the default selection;
    determining, using the configuration engine, a default selection to drop based on its strength level; and
    dropping, using the configuration engine, the determined default selection,
    wherein determining at least one set of conflicting choices comprises determining a plurality of sets of conflicting choices, and
    wherein dropping a default selection in the set of conflicting choices further comprises:
        ordering the plurality of sets of conflicting choices in a descending order according to the minimal strength level of all default selections in each set of conflicting choices; and
        dropping the determined default selections of the plurality of sets of conflicting choices in the descending order.

2. The method of claim 1 wherein determining a default selection to drop comprises selecting a default selection having a minimal strength level of all default selections in the set of conflicting choices to drop.

3. The method of claim 1 wherein dropping the default selection having the lowest strength level comprises informing the user of the conflict and requesting input from the user to resolve the conflict when a plurality of default selections in the set of conflicting choices share the lowest strength level.

4. The method of claim 1 wherein determining at least one set of conflicting choices comprises:
    determining a plurality of sets of conflicting choices, wherein dropping a default selection in the set of conflicting choices further comprises:
        determining if one or more other sets of conflicting choices also include the dropped default selection; and
        determining if one or more default selections in another set of conflicting choices including the dropped default selection was previously dropped and has a lower strength level than the dropped default selection; and
        re-picking a default selection that was previously dropped and has a lower strength than the dropped default selection.

5. The method of claim 1 further comprising informing the user that the default selection has been dropped via the user interface.

6. The method of claim 1 wherein the product configuration is one of a material product configuration, a service configuration, a business process configuration, and a technical process configuration.

7. The method of claim 1 wherein the configuration engine is associated with a Truth Maintenance System configured to determine sets of conflicting choices and perform automatic dropping of one or more choices.

8. A system for handling choices in a product configuration, the system comprising:
    one or more processors; and one or more non-transitory computer-readable media having instructions stored thereon, wherein the instructions are executable by the one or more processors to implement a method comprising:
    presenting a product configuration to a user via a user interface, the product configuration including one or more default selections; receiving a selection from the user of a configuration option via the user interface;
    determining at least one minimal set of conflicting choices relating to a conflict resulting from the user selection of the configuration option and one or more constraints of the product configuration, wherein the minimal set of conflicting choices includes choices directly contributing to the conflict such that dropping any choice will resolve the conflict;
    determining a strength level associated with each default selection in the minimal set of conflicting choices, wherein the strength level of each default selection is based on an authority associated with a source of the default selection; and dropping a default selection in the minimal set of conflicting choices that has a lowest strength level of all default selections in the minimal set of conflicting choices, wherein determining at least one minimal set of conflicting choices comprises determining a plurality of minimal sets of conflicting choices, and wherein dropping a default selection in the minimal set of conflicting choices further comprises:

ordering the plurality of minimal sets of conflicting choices in a descending order according to the lowest strength level of all default selections in each minimal set of conflicting choices; and dropping the determined default selections of the plurality of minimal sets of conflicting choices in the descending order.

9. The system of claim 8, wherein the product configuration is one of a material product configuration, a service configuration, a business process configuration, and a technical process configuration.

10. The system of claim 9, further comprising informing the user of at least one of the user selection of the configuration option and the one or more constraints of the product configuration resulting in the conflict.

11. The system of claim 8, wherein dropping the default selection in the minimal set of conflicting choices that has the lowest strength level of all default selections in the minimal set of conflicting choices comprises informing the user of the conflict and requesting input from the user to resolve the conflict when a plurality of choices in the minimal set of conflicting choices share the lowest strength level.

12. The system of claim 8, wherein determining at least one minimal set of conflicting choices comprises determining a plurality of minimal sets of conflicting choices, and wherein dropping a default selection in the minimal set of conflicting choices further comprises:

determining if one or more other minimal sets of conflicting choices also include the dropped default selection; and determining if one or more default selections in another minimal set of conflicting choices including the dropped default selection was previously dropped and has a lower strength level than the dropped default selection; and re-picking a default selection that was previously dropped and has a lower strength than the dropped default selection.

13. A configuration application comprising one or more non-transitory computer-readable media having instructions stored thereon, the instructions being executable by one or more processors to implement a method of handling choices in a product configuration, the method comprising:

presenting a product configuration to a user via a user interface; receiving a selection from the user of a configuration option via the user interface;

determining at least one minimal set of conflicting choices relating to a conflict resulting from the user selection of the configuration option and one or more constraints of the product configuration, wherein the minimal set of conflicting choices includes choices directly contributing to the conflict such that dropping any choice will resolve the conflict; determining a strength level associated with one or more choices in the minimal set of conflicting choices, each of the one or more choices being one of a user choice and a default choice, wherein the strength level of each choice is based on an authority associated with a source of the default selection; and dropping a choice in the minimal set of conflicting choices that has a lowest strength level of all choices in the minimal set of conflicting choices, wherein determining at least one minimal set of conflicting choices comprises determining a plurality of minimal sets of conflicting choices, and wherein dropping a choice in the minimal set of conflicting choices further comprises:

determining if one or more other minimal sets of conflicting choices also include the dropped choice;

determining if one or more default selections in another minimal set of conflicting choices including the dropped choice was previously dropped and has a lower strength level than the dropped choice; and re-picking a choice that was previously dropped and has a lower strength than the dropped choice.

14. The configuration application of claim 13, wherein determining at least one minimal set of conflicting choices comprises determining a plurality of minimal sets of conflicting choices, and wherein dropping a choice in the minimal set of conflicting choices further comprises:

ordering the plurality of minimal sets of conflicting choices in a descending order according to the lowest strength level of all choices in each minimal set of conflicting choices; and dropping the determined choices of the plurality of minimal sets of conflicting choices in the descending order.

15. The configuration application of claim 13, wherein the product configuration is one of a material product configuration, a service configuration, a business process configuration, and a technical process configuration.

16. The configuration application of claim 13, wherein dropping the choice in the minimal set of conflicting choices that has the lowest strength level of all choices in the minimal set of conflicting choices comprises informing the user of the conflict and requesting input from the user to resolve the conflict when a plurality of choices in the minimal set of conflicting choices share the lowest strength level.

17. The configuration application of claim 13, further comprising informing the user of at least one of the user selection of the configuration option and the one or more constraints of the product configuration resulting in the conflict.

* * * * *